United States Patent
Tang et al.

(10) Patent No.: US 9,710,176 B1
(45) Date of Patent: Jul. 18, 2017

(54) MAINTAINING WEAR SPREAD BY DYNAMICALLY ADJUSTING WEAR-LEVELING FREQUENCY

(71) Applicant: SK hynix memory solutions inc., San Jose, CA (US)

(72) Inventors: Xiangyu Tang, San Jose, CA (US); Lingqi Zeng, San Jose, CA (US); Zheng Wu, San Jose, CA (US)

(73) Assignee: SK Hynix Memory Solutions Inc., San Jose, CA (US)

( * ) Notice: Subject to any disclaimer, the term of this patent is extended or adjusted under 35 U.S.C. 154(b) by 44 days.

(21) Appl. No.: 14/817,113

(22) Filed: Aug. 3, 2015

Related U.S. Application Data (60) Provisional application No. 62/040,813, filed on Aug. 22, 2014.

(51) Int. Cl.
 *G06F 12/00* (2006.01)
 *G06F 3/06* (2006.01)
 *G06F 12/02* (2006.01)

(52) U.S. Cl.
 CPC ............ *G06F 3/0616* (2013.01); *G06F 3/064* (2013.01); *G06F 3/0679* (2013.01); *G06F 12/0246* (2013.01)

(58) Field of Classification Search
 None
 See application file for complete search history.

(56) References Cited

U.S. PATENT DOCUMENTS

| | | | | |
|---|---|---|---|---|
| 2009/0265508 | A1* | 10/2009 | Bennett | G06F 12/0246 711/103 |
| 2012/0023144 | A1* | 1/2012 | Rub | G06F 12/0246 707/813 |
| 2013/0219113 | A1* | 8/2013 | Liebowitz | G06F 3/0616 711/103 |
| 2013/0282954 | A1* | 10/2013 | Sankar | G06F 3/061 711/103 |
| 2015/0186055 | A1* | 7/2015 | Darragh | G06F 3/0616 711/103 |
| 2015/0186072 | A1* | 7/2015 | Darragh | G06F 3/0653 711/103 |
| 2015/0254178 | A1* | 9/2015 | Van Aken | G06F 12/0246 711/103 |

* cited by examiner

*Primary Examiner* — Brian Peugh
(74) *Attorney, Agent, or Firm* — IP&T Group LLP (57) ABSTRACT

A wear statistic associated with a wear metric distribution is determined, wherein the wear metric distribution is a distribution of a wear metric associated with a group of solid state storage cells. A wear-leveling period is determined, wherein the wear-leveling period is based at least in part on the wear statistic, wherein the wear-leveling period is a measure of time or operations between two wear-leveling operations performed on the group of solid state storage cells.

24 Claims, 6 Drawing Sheets

MAINTAINING WEAR SPREAD BY DYNAMICALLY ADJUSTING WEAR-LEVELING FREQUENCY

CROSS REFERENCE TO OTHER APPLICATIONS

This application claims priority to U.S. Provisional Patent Application No. 62/040,813 entitled MAINTAINING WEAR-LEVELING SPREAD THROUGH DYNAMICALLY ADJUSTING WEAR-LEVELING FREQUENCY filed Aug. 22, 2014 which is incorporated herein by reference for all purposes.

BACKGROUND OF THE INVENTION

Solid state storage cells, including NAND flash memories, are increasingly gaining market share in both enterprise and consumer data storage solutions. They are resilient to shock and their I/O performance is better than that of conventional hard disk drives. A NAND flash memory is divided into many blocks and each block is divided into many pages. A page contains multiple logic block addresses (LBAs), which are the smallest memory unit that can be accessed by the host device.

Unlike dynamic random access memory (DRAM), NAND flash memories incur significant 'wear' over use. There exists a need to monitor and guide wear such that NAND flash memory life is extended.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

NAND memory management includes a process of garbage collection and a process of wear-level management.

Garbage Collection.

A unit of NAND flash memory called a block contains a plurality of LBAs. Unlike magnetic storage drives, NAND flash memories do not support in-place updates. When data associated with an LBA is to be over-written with new data, its present location in a block is simply marked as "invalid" and the new data is written to a new location in another block.

Over time, many LBAs in a block will gradually become invalid. To reclaim the invalid locations in the block, the data associated with the remaining valid LBAs is read and written into another block, thus opening the entire block for erasure and subsequent writing with new data. Erasing the block is termed a "block erasure" operation. This reclaiming process is termed "garbage collection". When a solid-state drive (SSD) runs out of empty blocks to write new data, a new write request will result in garbage collection being done to create empty blocks. Therefore, writing new data into the drive could cause several write operations to occur: the host write itself, and the writes during garbage collection.

Write Amplification.

Write amplification (WA) is defined as the ratio of the total number of writes to the NAND to the number of host writes. For example, if the host writes 1 LBA to the SSD and in the process caused garbage collection to conduct 1 extra write, the WA would be 2. Reducing write amplification is an important goal of NAND flash management.

Wear-Level Management.

Another goal of NAND management is controlling the wear-level of blocks in the drive. There are two goals in wear-level management associated with even wear and tight wear spread. Any person having ordinary skill in the art will understand the principles described throughout this specification apply generally and without limitation to any system that incurs wear: NAND flash is given as one of many embodiments.

Even Wear.

A block can only tolerate a certain number of program/erase (P/E) cycles. After it exceeds this number, the block may no longer retain memory properly and may arbitrarily degrade. In one embodiment, a firmware will set a conservative scalar as the P/E cycle limit to ensure a user is not surprised with a degradation of memory. When this scalar has been reached, the block is considered bad and cannot be used. Therefore, keeping the wear-level of the blocks in a drive even is desirable so that no single block will be prematurely worn out.

Tight Wear Spread.

Another benefit of keeping the P/E cycles evenly distributed is to prevent premature triggering of a progressive incremental step pulse program (P-ISPP). A NAND cell is programmed using an incremental step pulse. At various P/E cycles, the incremental step pulse is progressively changed to maximize programming speed while maintaining low error rates; there is an optimal pulse width for a block given its P/E cycle count. For low P/E cycle counts, certain pulse widths give efficient programming speeds. For high P/E cycle counts, however, those same pulse widths may result in large errors.

A wear spread is a metric of the range of P/E cycle counts for all the blocks in a drive. In many systems, only a single P-ISPP setting is used for the entire drive. A single pulse width for the entire drive over every block presents an issue if the wear spread is too large: one size does not fit all. During implementation, if the wear spread is too large, depending on when a P-ISPP change is triggered, some of the blocks will be programmed with an inappropriate P-ISPP setting, resulting in either large errors or low programming speed. Ensuring that the blocks have similar wear-levels throughout the SSD's lifetime allows the single P-ISPP setting to be as efficient as possible and reduces the probability of errors.

Managing Wear-Level is Disclosed.

In one embodiment, a technique to manage wear-levels is to move the data in a block with low wear-level into a block with high wear-level to free up the low wear-level block for use and/or moderate wear spread.

Data with frequently written data is termed "hot data" and the term "hot block" refers to blocks currently with hot data. A hot block is not necessarily the same as a block with high P/E cycle count, since the hot data may be moved to a block with low P/E cycle count. Thus, there are two different types of blocks: The first type is blocks with hot or cold data, and the second type is blocks with high or low P/E cycle count. The two types are not necessarily identical. In general, without wear-leveling, blocks with low P/E cycle count contain cold data, and blocks with high P/E cycle count contain hot data. One goal of wear-leveling is to move hot data in high P/E cycle count blocks to blocks with low P/E cycle count. However, a low P/E cycle count block may contain hot data, in part due to a previous wear-leveling operation.

In one embodiment, this is done as part of the block erasure/garbage collection process to reduce overhead.

In one embodiment, after a wear-level operation, a current timestamp is recorded for both the hot block and the cold block. This current timestamp may be used in future wear-level operations to prioritize future blocks to perform a wear-level operation on.

A key parameter when managing wear-leveling is conducting operations with an appropriate frequency, depending on workload. Given a particular workload, if the frequency is too low, then the wear spread will become too wide. Conversely, if the frequency is too high, then overhead will become high and efficiency diminished. This frequency of wear-leveling operations is termed a "wear-leveling frequency". A related measure is the "wear-leveling period", which is a measure of time between wear-leveling operations inversely related to the wear-leveling frequency.

Traditional methods of determining the wear-leveling period include (a) using a fixed period, or (b) determining the wear-leveling period based on the number of blocks outside, or below, a specific wear spread.

An issue with these traditional methods is that under certain patterns of workload, a very small number of blocks are quickly cycled to a P/E value much higher than the rest of the blocks. Thus simply using the number of blocks outside a static wear spread is not adequate, since it is very small, and in pathological workload cases may result in uncontrolled wear spread.

Adjusting the wear-level operation frequency dynamically according to an associated drive's conditions is disclosed. By adjusting frequency dynamically, wear spread of the drive is maintained with lower overhead.

In one embodiment, wear-leveling is conducted during garbage collection. For every T block erases, one wear-leveling operation is conducted, and T is termed the wear-leveling period. In one example, the wear-leveling period is dynamically adjusted according to the wear spread of the drive, which in turn is dependent on user traffic and algorithms used for block erasure and/or garbage collection.

The wear-leveling period is small when the P/E cycle spread is large in order to maintain tight wear-spread. The period is large when the P/E cycle spread is small in order to reduce overhead. A target wear spread is a value under which wear-leveling is not necessary and/or very infrequent. For example, if the target wear spread is 10, then if all blocks have a P/E cycle count between +5 and −5 of the average block P/E cycle count, wear-leveling is done very infrequently. Otherwise, wear-leveling is conducted more frequently.

Thus, in contrast to traditional methods, both the number of blocks outside the designed wear spread as well as the difference between the actual and specified wear spread is used to determine the wear-leveling period. Furthermore, in some embodiments the period is bounded between a maximum and a minimum value, and can be fine-tuned by using a single parameter.

During the wear-leveling, and/or garbage collection operations, a victim and a target block are chosen. The valid data in the victim block is written into the target block, and the victim is erased. Any appropriate technique for identifying the victim block during garbage collect/wear-leveling operations, identifying target blocks, and/or separating data during garbage collection/wear-leveling may be used and may be generally applied and without limitation to the techniques disclosed. For example, the timestamp described above may be used to prioritize the next victim block and target block.

Figure 1:
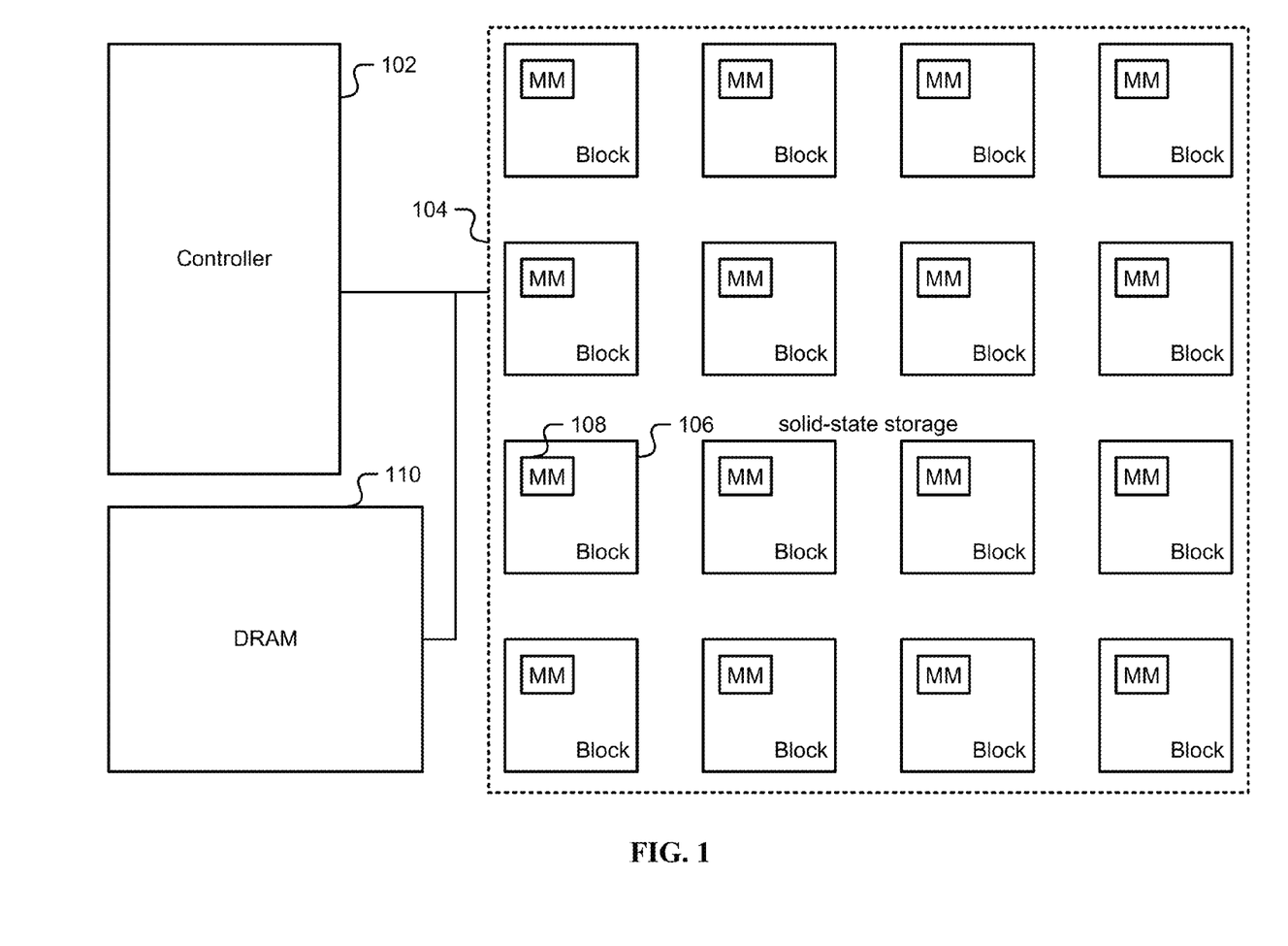
FIG. 1 is a block diagram illustrating an embodiment of a system for managing wear-level operations.

FIG. 1 is a block diagram illustrating an embodiment of a system for managing wear-level operations.

Memory controller (102) is coupled to solid-state storage fabric (104). Solid-state storage 104 comprises a plurality of blocks (106), each with many LBAs (not shown) and with a specialized meta-memory scratchpad (108) to store:
 a P/E cycle count for the block;
 a timestamp for the last wear-leveling operation; and/or
 a timestamp for the last garbage collection operation.

Memory controller (102) is also coupled to a controller DRAM (110) for storage/execution of instruction and to store a cached version of the flash translation table journaled to the solid-state storage.

Figure 2A:
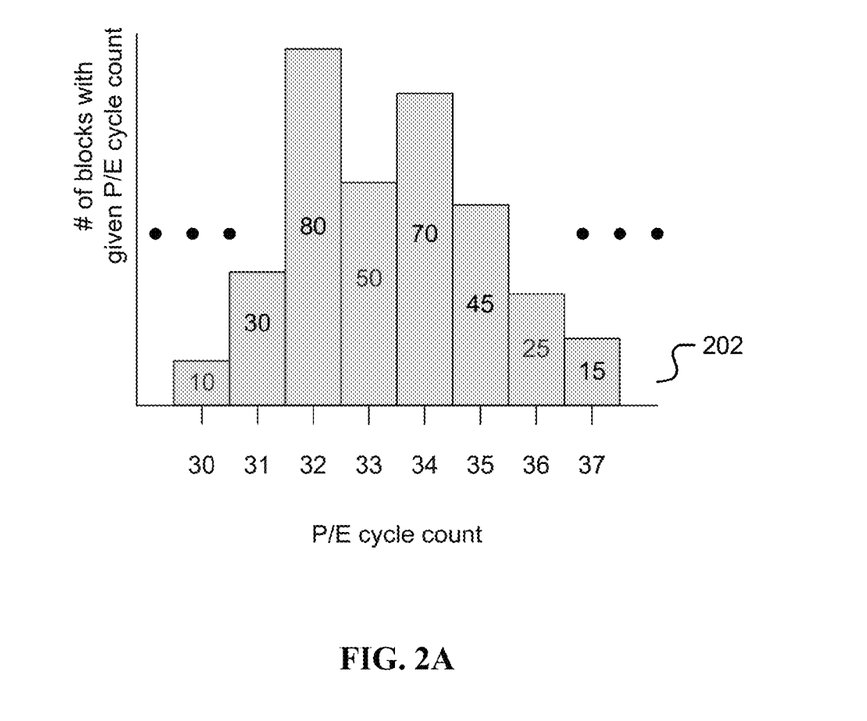
FIG. 2A is an illustration of a wear metric distribution.

FIG. 2A is an illustration of a wear metric distribution. In one embodiment, the P/E cycle count is represented along the x-axis of the wear metric distribution, and the number of blocks with the given P/E cycle count is represented along the y-axis of the wear metric distribution. In the illustration (202) shown, the y-axis value is shown within the bar for a given P/E cycle count.

For example, for a drive represented by the wear metric distribution in FIG. 2A there are:
- 10 blocks with a P/E cycle count of 30;
- 30 blocks with a P/E cycle count of 31;
- 80 blocks with a P/E cycle count of 32;
- 50 blocks with a P/E cycle count of 33;
- 70 blocks with a P/E cycle count of 34;
- 45 blocks with a P/E cycle count of 35;
- 25 blocks with a P/E cycle count of 36; and
- 15 blocks with a P/E cycle count of 37.

As represented by the ellipses, not shown in FIG. 2A but part of the wear metric distribution, the number of blocks with P/E cycle counts less than 30 or greater than 37.

The illustration in FIG. 2A is but an example of the wear metric distribution. Throughout this specification and without limitation "wear metric distribution" refers to any continuous or binned or discrete, non-cumulative or cumulative, heuristic or analytical, histogram, binned histogram, mass function, density function and/or distribution function that relates a count of blocks with a given wear metric.

Figure 2B:
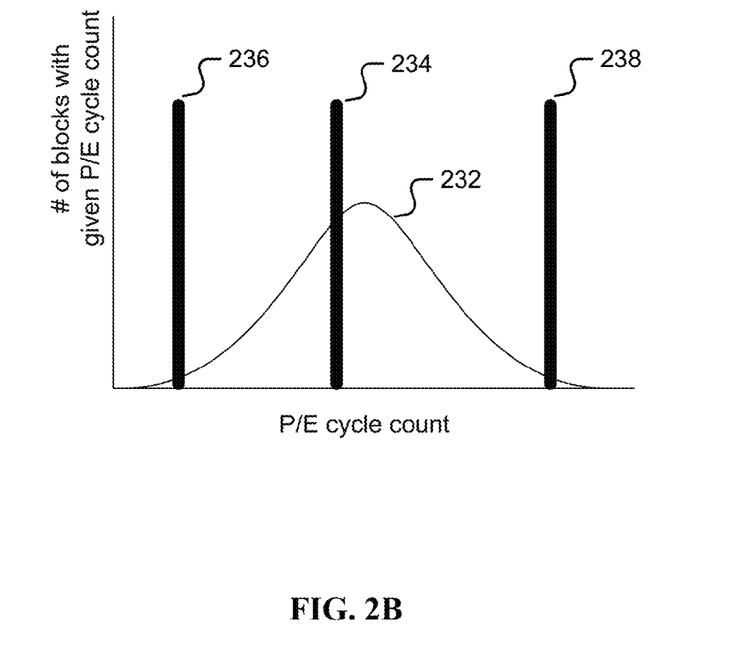
FIG. 2B is an illustration of a wear spread.

FIG. 2B is an illustration of a wear spread. Wear metric distribution (232) is shown with three key P/E cycle counts. There is a center-like point (234), which may include for distribution (232) a statistical average/mean, an ensemble mean, a time mean, a median, a mode, a first or higher order central moment or a function of correlation and/or covariance.

There is a lower-bound (236), which may include a statistical bound based on, for example, a standard deviation, a variance, a first or higher order central moment, or a function of correlation and/or covariance. In one embodiment the lower-bound is based on the minimum or smallest P/E cycle count with a non-zero block count for a given distribution. In one embodiment the lower-bound is a scalar number of the minimum or smallest P/E cycle count with a non-zero block count designed for nominal conditions not requiring much wear-leveling. In one embodiment the lower-bound is based on a scalar less than the average point (234), for example 64 blocks less than the average point (234).

There is an upper-bound (238), which may include a statistical bound based on, for example, a standard deviation, a variance, a first or higher order central moment, or a function of correlation and/or covariance. In one embodiment the upper-bound is based on the maximum or largest P/E cycle count with a non-zero block count. In one embodiment the upper-bound is a scalar number of the maximum or largest P/E cycle count with a non-zero block count designed for nominal conditions not requiring much wear-leveling. In one embodiment the upper-bound is based on a scalar greater than the average point (234), for example 64 blocks more than the average point (234).

The wear spread is the difference between upper-bound (238) and lower-bound (236). In the example above, the wear spread between 64 P/E cycles more than average point (234) and 64 P/E cycles less than average point (234) would be a wear spread of 128 P/E cycles.

Figure 2C:
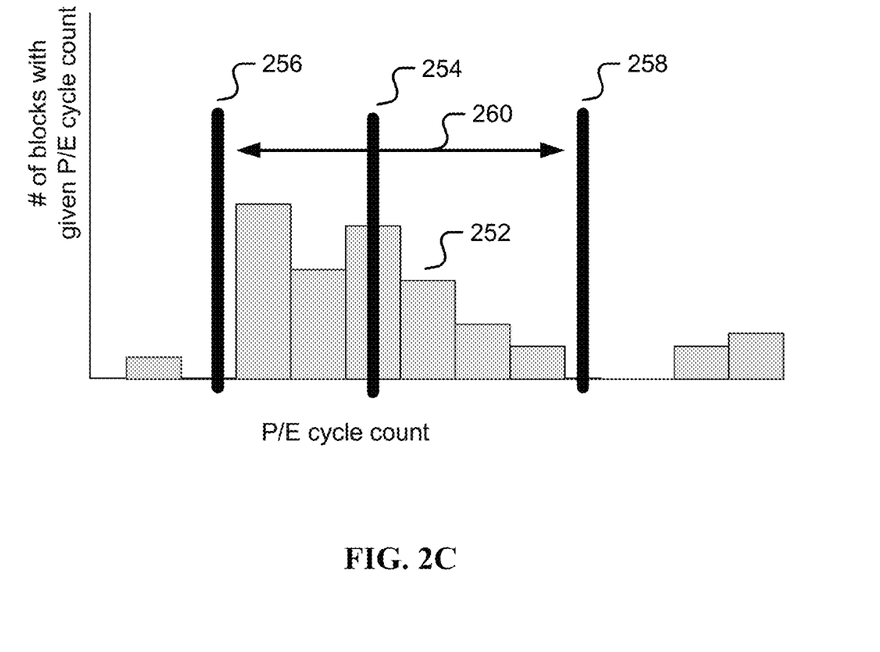
FIG. 2C is a second illustration of wear spread.

FIG. 2C is a second illustration of wear spread. A binned and discrete distribution (252) is shown with an off-center average (254) and a lower-bound (256) of 20 P/E cycles with an upper-bound (258) of 30 P/E cycles. This results in a wear spread (260) of 50 P/E cycles.

Figure 3:
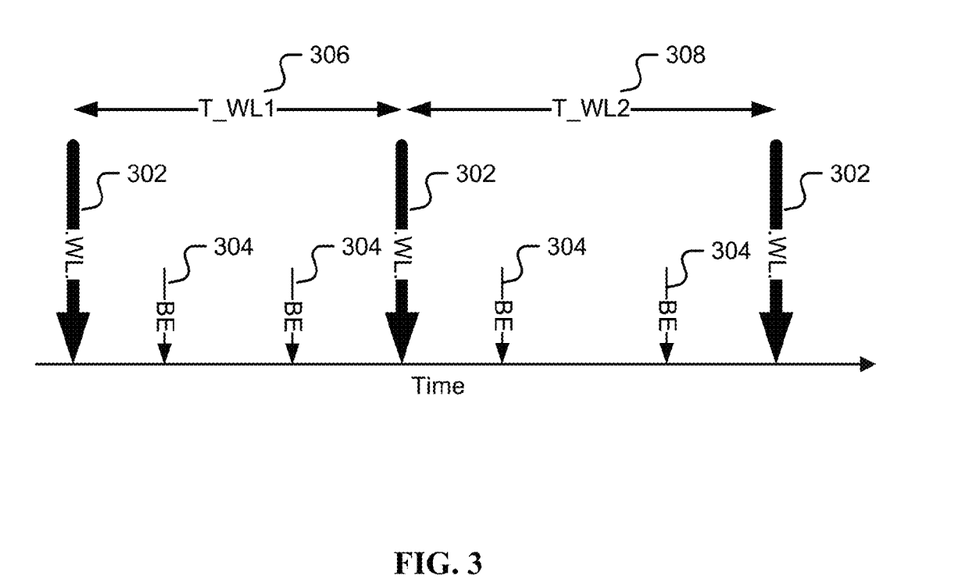
FIG. 3 is an illustration of wear leveling operations as they relate to block erasure operations.

FIG. 3 is an illustration of wear leveling operations as they relate to block erasure operations. Time is represented along the x-axis. The dark arrows (302) indicate the time when a wear leveling operation occurs. The lighter arrows (304) indicate the time when a block erasure operation occurs. In the example shown in FIG. 3, a wear level operation occurs every three block erasure operations.

In one embodiment, wear-leveling period is expressed in terms of time. In another embodiment, wear-leveling period is expressed as T in terms of "every T garbage collections". In another embodiment, wear-leveling period is expressed as T in terms of "every T block erases". In another embodiment, wear-leveling period is expressed as T in terms of "every T blocks erases and/or garbage collections". Wear-leveling period T_WL1 (306) is the first wear-leveling period and in the example shown is 3. Wear-leveling period T_WL2 (308) is the successive wear-leveling period and in the example shown is also 3. T_WL1 and T_WL2 may be the same (in this case 3) but may be different in terms of time because of difference in when a block erase is actually scheduled.

Figure 4:
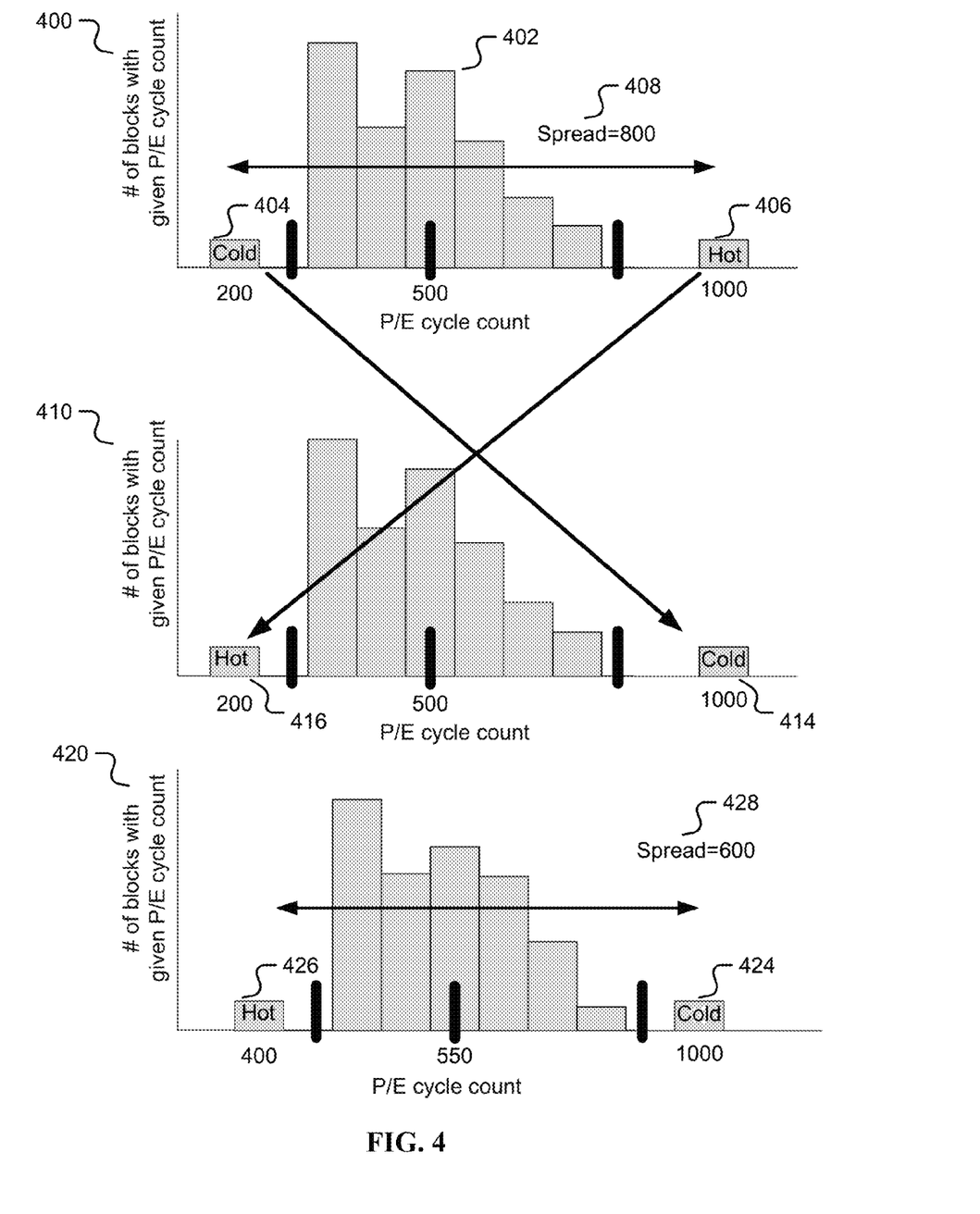
FIG. 4 is an illustration of a wear-leveling operation.

FIG. 4 is an illustration of a wear-leveling operation. The illustration in FIG. 4 may take place on the drive depicted in FIG. 1.

At a given time, the drive has wear metric distribution (400). The wear metric distribution (400) includes a lower-bound and upper-bound centered at 500 P/E cycles (402). As an example, the nominal lower-bound is 500−64=436 P/E cycles, and the nominal upper-bound is 500+64=564 P/E cycles. Outside of these bounds there is a cold block (404) at 200 P/E cycles of wear, and a hot block (406) at 1000 P/E cycles of wear. An example of a cold block is a block within a video or photo on a phone wherein a user rarely rewrites and/or deleted the block. An example of a hot block is a block in the operating system of a phone that gets consistently rewritten and/or deleted. Thus there are at least two blocks (404), (406) that are outside the nominal wear spread of 128 P/E cycles, and the actual wear spread (408) is 1000−200=800 P/E cycles.

After wear-leveling operation time, the drive has wear metric distribution (410). The wear-level operation has swapped the data in the cold block (404) and hot block (406) such that the physical block (416) now contains hot data, and physical block (414) now contains cold data. Note that the actual wear spread at this time still remains 1000−200=800 P/E cycles. For some of the reasons given above, including that the single P-ISPP pulse width may not be equally appropriate for block (404) and for block (406) and may partially damage the drive, the wear metric distribution 400 becomes a good candidate for wear-leveling as will be shown.

In one embodiment, a timestamp is recorded for physical blocks (414), (416) in respective block meta-memory 108 such that the wear-level operation algorithm can discern recently exchanged blocks. In one embodiment, a waiting period may be implemented for a given block after a wear-leveling operation algorithm. For example, 25% of the blocks in a drive may need to written before a given block may be a candidate for another wear-leveling operation.

After more time has passed, the drive now has wear metric distribution (420). The hot data has continued to drive physical block (416) to a new P/E cycle count (426) of 400. Generally the nominal lower-bound and upper-bound remain to give a nominal spread of 128 P/E cycles, but as more data is rewritten and/or deleted, the nominal distribution is centered at 550 P/E cycles. The cold data without much additional wear has remained at a P/E cycle count (424) of 1000. By performing the wear-leveling operation (410) the wear spread (428) has been reduced to 1000−400=600 P/E cycles.

Embodiment of Dynamic Adjustment.

An example of a dynamic adjustment based on a wear metric distribution is disclosed. Naturally, in other embodiments, the technique may be performed in some other manner.

Define and/or assign:

$\delta$ as the actual P/E cycle spread based at least in part on the wear-level distribution;

$\delta'$ as the nominal P/E cycle spread;

$\beta$ as the maximum wear-leveling period. By preemptively doing wear-leveling, the total number of wear-leveling operation can be reduced. Thus, when no blocks are above or below the nominal P/E cycle spread, a wear-leveling operation is done every $\beta$ block erasures and/or garbage collections; and $\gamma$ as the minimum value of wear-leveling operation period. The minimum value prevents too many wear-leveling operations to be conducted in a short period of time in order to maintain quality of service (QoS).

For a scalar $\alpha$ the wear-level period is set by a relationship WLP:

$$WL\ Period = \max\left(\gamma, \frac{\beta}{\text{number of blocks outside nominal wear spread} + f(\delta)}\right)$$

where $$f(\delta) = \begin{cases} 1, & \delta \leq \delta' \\ \frac{\alpha(\delta - \delta')}{\delta'}, & \text{otherwise} \end{cases}.$$

The value $\alpha$ is used to fine-tune the wear-leveling period. In some embodiments, the value of $\alpha$ is between 50 and 150. The larger $\alpha$, the more frequent the wear-leveling operation is conducted when there is a block outside the nominal wear spread.

The relationship WLP disclosed above is an example of many of relating the wear-level period between wear-level operations to a function of the wear-level distribution. Other examples exist including:

$$WL\ Period = \beta;$$

$$WL\ Period = \max(\gamma, \beta); \text{ and}$$

$$WL\ Period = \max\left(\gamma, \frac{\beta}{\text{number of blocks outside nominal wear spread}}\right).$$

Effect of Dynamic Adjustment.

Figure 5:
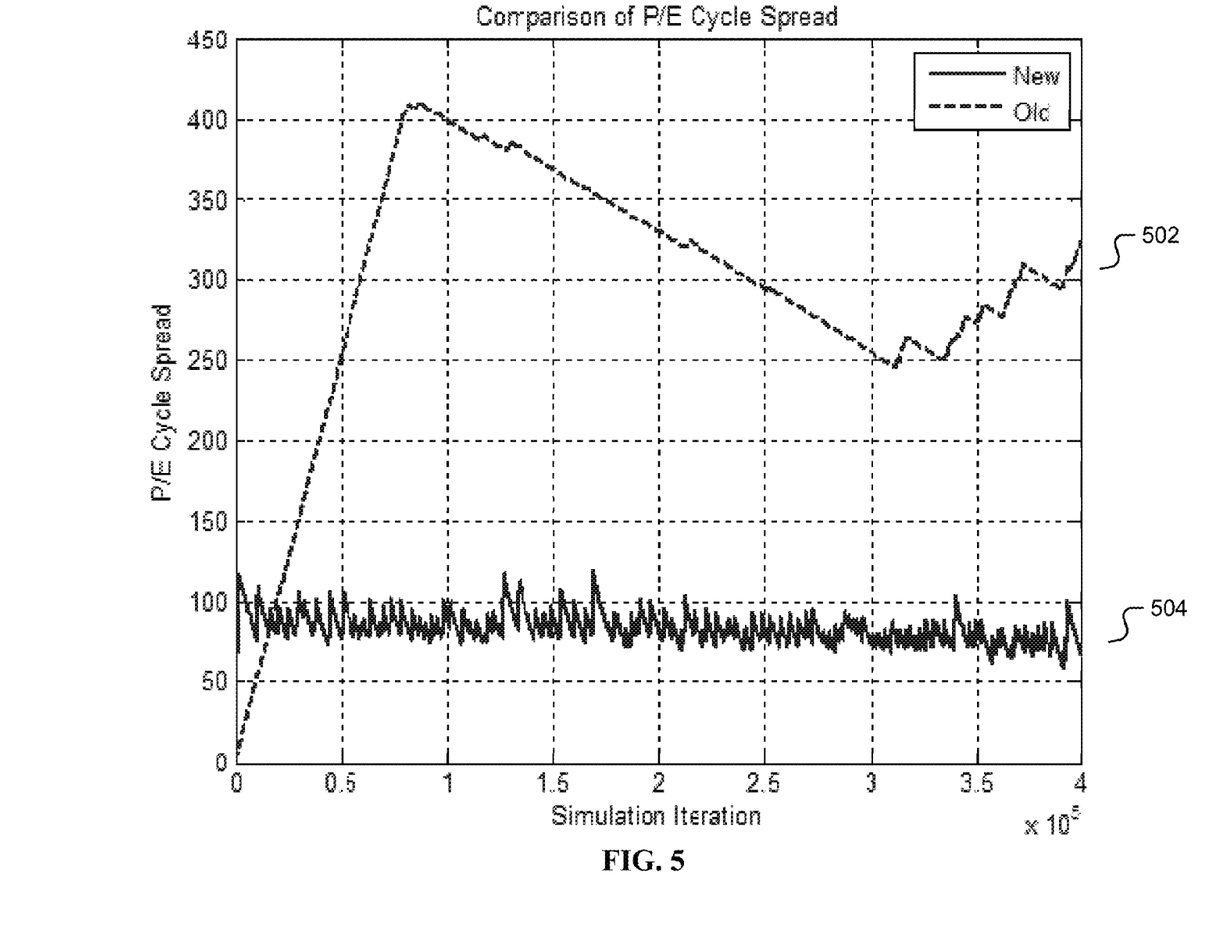
FIG. 5 is an illustration of the effectiveness of dynamic adjustment.

FIG. 5 is Error! Reference source not found. an illustration of the effectiveness of dynamic adjustment. A simulation is carried out between a dynamic adjustment algorithm (indicated by "New") and a traditional algorithm (indicated by "Old"). In both techniques, the target block during wear-leveling and block erasure/garbage collection is randomly chosen from the available free block pool. The victim block during wear-leveling is the block with the lowest P/E cycle for both techniques. Furthermore, in both techniques, 4 blocks with the highest P/E cycle is forbidden from being chosen as the victim block during block erasure/garbage collection and wear-leveling operations and the minimum wear-leveling period is 4.

In the old technique (502), the wear-leveling period is determined only using the number of blocks below the designed P/E cycle spread. In this technique, $\alpha$ is 200, $\beta$ is 50 and $\gamma$ is 4. The nominal P/E cycle spread in both techniques is 64.

In comparison to the static technique (502), the dynamic adjustment technique (504) is more effective at keeping the P/E cycle spread tight. The traffic pattern used in this test is a stress pattern, where the SSD drive is fully preconditioned sequentially, and only 1% of the capacity is actively written. Under this traffic pattern, a small number of blocks will be heavily cycled while the overwhelming majority of the blocks will not be cycled at all. As seen by the graph in FIG. 5, if only the number of blocks below or above the nominal P/E cycle spread is used to determine the wear-leveling period, the wear-level spread will quickly increase (502).

Taking the actual P/E cycle spread and/or wear metric distribution also into consideration will result in a much tighter spread. The tighter spread will result in the proper operation of P-ISPP, and ensure that all blocks wear out evenly, which help increases drive life.

Figure 6:
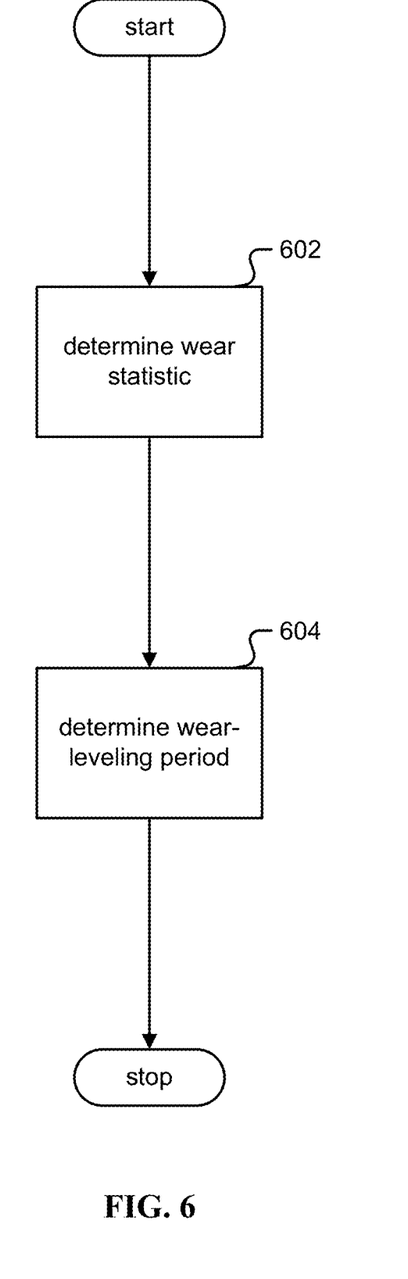
FIG. 6 is a flowchart for maintaining wear spread by dynamically adjusting wear-leveling frequency.

FIG. 6 is a flowchart for maintaining wear spread by dynamically adjusting wear-leveling frequency. This process may be implemented by memory controller (102) in FIG. 1. In some embodiments, the process is performed by a semiconductor device, such as an application-specific integrated circuit (ASIC) or a field-programmable gate array (FPGA). In the example shown, the process begins (602) by determining the wear statistic.

This step (602) includes determining the wear statistic associated with the wear metric distribution (202), wherein the wear metric distribution (202) is a distribution of a wear metric associated with the group of solid state storage cells (104).

The next step (604) includes determining a wear-leveling period (306)/(308) based at least in part on the wear statistic, wherein the wear-leveling period is a measure of time between two wear-leveling operations performed on the group of solid state storage cells (104), as illustrated in FIG. 3.

In one embodiment, the wear metric is based at least in part on a count of program/erase cycles for a given block within the group of solid state storage cells (104).

In one embodiment, the wear statistic is based at least in part on a wear spread (260 between a first wear metric (256) and a second wear metric (258), as illustrated in FIG. 2C.

In one embodiment, the first wear metric is associated with a min block within the group of solid state storage cells with the least program/erase cycles (404), and the second wear metric is associated with a max block within the group of solid state storage cells with the most program/erase cycles (406), as illustrated in FIG. 4.

In one embodiment, the specified spread is centered on a mean block program/erase cycle (254).

In one embodiment, the wear statistic is based at least in part on a wear percentage deviation of the wear spread from a specified spread, as shown in relationship WLP.

In one embodiment, the wear-leveling period is based at least in part on a maximum value of a first value based at least in part on a min period scalar, and a second value based at least in part on a count of blocks with program/erase cycles outside of the specified spread and the wear percentage deviation, as shown in relationship WLP.

In one embodiment, the second value is based at least in part on a max value scalar divided by the count of blocks with program/erase cycles outside of the specified spread added to the wear percentage deviation multiplied by a fine-tune scalar, as shown in relationship WLP.

In one embodiment, the wear-leveling frequency is inversely related to the wear-leveling period.

In one embodiment, the group of solid state storage cells (104) comprises one or more blocks (106), wherein each block comprises a meta memory (108) that stores a program/erase cycle counter.

In one embodiment, the group of solid state storage cells (104) comprises one or more blocks (106), wherein each block comprises a meta memory (108) that stores a sequence number related to a timestamp recording a last time when a wear-leveling was performed for a given block.

In one embodiment, the wear-leveling period (306)/(308) is specified by a number of block erases and/or garbage collections (304) for a given block between each wear-leveling.

In one embodiment, the memory controller (102) is further configured to perform a wear-leveling operation (306)/(308)/on a block every N block erases and/or garbage collections, wherein N is the wear-leveling period for the block.

In one embodiment, the wear-leveling operation comprises moving data in a victim block with low wear-level into a target block with high wear-level as illustrated in FIG. 4.

In one embodiment, identifying the victim block or the target block is based upon a block erasure operation and/or a garbage collection operation.

In one embodiment, identifying the victim block or the target block is based upon a timestamp.

In one embodiment, the group of solid state storage cells (104) comprises one or more blocks (106), where each block comprises pages, and each page comprises logical block addresses (LBAs).

In one embodiment, the group of solid state storage cells does not support in-place updates for an LBA.

In one embodiment, the memory controller (102) is further configure to trigger a change to a progressive incremental step pulse program (P-ISPP) based at least in part on the wear metric distribution (202).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a non-volatile memory comprising a group of solid state storage cells;
a memory controller coupled with the non-volatile memory, wherein the memory controller is configured to:
determine a wear statistic associated with a wear metric distribution, wherein the wear metric distribution is a distribution of a wear metric associated with the group of solid state storage cells; and
determine a wear-leveling period based at least in part on the wear statistic, wherein the wear-leveling period is a measure of time or operations between two wear-leveling operations performed on the group of solid state storage cells.

2. The system recited in claim 1, wherein the wear metric is based at least in part on a count of program/erase cycles for a given block within the group of solid state storage cells.

3. The system recited in claim 2, wherein the wear statistic is based at least in part on a wear spread between a first wear metric and a second wear metric.

4. The system recited in claim 3, wherein the first wear metric is associated with a block with a smallest number of P/E cycle count within the group of solid state storage cells, and the second wear metric is associated with a block with a largest number of P/E cycle count within the group of solid state storage cells.

5. The system recited in claim 4, wherein the wear statistic is based at least in part on a wear percentage deviation of the wear spread from a nominal spread.

6. The system recited in claim 5, wherein the nominal spread is centered on a mean program/erase cycle count.

7. The system recited in claim 6, wherein the wear-leveling period is based at least in part on a maximum value of a first value based at least in part on a minimum period scalar, and a second value based at least in part on a count of blocks with program/erase cycles outside of the specified spread and the wear percentage deviation.

8. The system recited in claim 7, wherein the second value is based at least in part on a maximum value scalar divided by the count of blocks with program/erase cycles outside of the specified spread added to the wear percentage deviation multiplied by a fine-tune scalar.

9. The system recited in claim 1, wherein a wear-leveling frequency is inversely related to the wear-leveling period.

10. The system recited in claim 1, wherein the group of solid state storage cells comprises one or more blocks, wherein each block comprises a meta memory that stores a program/erase cycle counter.

11. The system recited in claim 1, wherein the group of solid state storage cells comprises one or more blocks, wherein each block comprises a meta memory that stores a sequence number related to a timestamp recording a last time when a wear-leveling was performed for a given block.

12. The system recited in claim 1, wherein the wear-leveling period is specified by a number of garbage collections for a given block between each wear-leveling.

13. The system recited in claim 1, wherein the wear-leveling period is specified by a number of block erasures for a given block between each wear-leveling.

14. The system recited in claim 1, wherein the wear-leveling period is specified by a combination of number of block erasures and garbage collections for a given block between each wear-leveling.

15. The system recited in claim 1, wherein the memory controller is further configured to perform a wear-leveling operation on a block every N garbage collections, wherein N is the wear-leveling period for the block and N>0.

16. The system recited in claim 15, wherein the wear-leveling operation comprises moving data in a victim block with low P/E cycle count into a target block with high P/E cycle count.

17. The system recited in claim 1, wherein the memory controller is further configured to perform a wear-leveling operation on a block every N erases, wherein N is the wear-leveling period for the block and N>0.

18. The system recited in claim 17, wherein identifying the victim block or the target block is based upon a block erasure operation or garbage collection operation.

19. The system recited in claim 18, wherein the group of solid state storage cells does not support in-place updates for an LBA.

20. The system recited in claim 17, wherein identifying the victim block or the target block is based upon a timestamp.

21. The system recited in claim 1, wherein the memory controller is further configured to perform a wear-leveling operation on a block every N erases and garbage collections, wherein N is the wear-leveling period for the block and N>0.

22. The system recited in claim 1, wherein the group of solid state storage cells comprises one or more blocks, where each block comprises pages, and each page comprises logical block addresses (LBAs).

23. The system recited in claim 1, wherein the memory controller is further configure to trigger a change to a progressive incremental step pulse program based at least in part on the wear metric distribution.

24. A method, comprising:
   determining a wear statistic associated with a wear metric distribution, wherein the wear metric distribution is a distribution of a wear metric associated with a group of solid state storage cells; and
   determining a wear-leveling period based at least in part on the wear statistic, wherein the wear-leveling period is a measure of time or operations between two wear-leveling operations performed on the group of solid state storage cells.

* * * * *